(12) United States Patent
Korzilius et al.

(10) Patent No.: US 6,239,081 B1
(45) Date of Patent: May 29, 2001

(54) ALKALI-METAL-CARBOXYLATE-CONTAINING DRILLING FLUID HAVING IMPROVED CORROSION PROPERTIES

(75) Inventors: Joachim Korzilius, Eschborn; Peter Minks, Altötting, both of (DE)

(73) Assignee: Clariant GmbH, Frankfurt (DE)

( * ) Notice: Subject to any disclaimer, the term of this patent is extended or adjusted under 35 U.S.C. 154(b) by 0 days.

(21) Appl. No.: 09/387,400

(22) Filed: Sep. 2, 1999

(30) Foreign Application Priority Data

Sep. 5, 1998 (DE) ............................................ 198 40 632

(51) Int. Cl.$^7$ ...................................................... C09K 7/02
(52) U.S. Cl. ............................. 507/145; 507/141; 507/939
(58) Field of Search ................................. 507/141, 145, 507/939

(56) References Cited

U.S. PATENT DOCUMENTS

| 4,440,649 | * | 4/1984 | Loftin et al. ........................... 507/145 |
| 4,900,457 | * | 2/1990 | Clarke-Sturman et al. ......... 507/145 |
| 5,629,271 | * | 5/1997 | Dobson, Jr. et al. ................. 507/141 |
| 5,785,747 | * | 7/1998 | Vollmer et al. ....................... 507/145 |
| 5,804,535 | * | 9/1998 | Dobson et al. ....................... 507/141 |

FOREIGN PATENT DOCUMENTS

| 2220315 | * | 6/1998 | (CA) . |
| 0 572 113 A1 | | 12/1993 | (EP) . |
| WO 99/23188 | | 5/1999 | (WO) . |
| WO 95/21900 | | 8/1999 | (WO) . |
| WO 95/24452 | | 9/2000 | (WO) . |

OTHER PUBLICATIONS

J.D. Downs, Shell Research, Inc., "Formate Brines: Novel Drilling and Completion Fluids for Demanding Enviroments", SPE 25177, pp. 267–279, (1993).

* cited by examiner

Primary Examiner—Philip Tucker
(74) Attorney, Agent, or Firm—Susan S. Jackson; Scott E. Hanf

(57) ABSTRACT

The present invention relates to water-based drilling fluids having decreased corrosion properties which comprise, in addition to alkali metal carboxylates, boron compounds and, if appropriate, clays, polymers and coinhibitors.

6 Claims, No Drawings

ALKALI-METAL-CARBOXYLATE-CONTAINING DRILLING FLUID HAVING IMPROVED CORROSION PROPERTIES

FIELD OF THE INVENTION

The present invention relates to an alkali-metal-carboxylate-containing drilling fluid which has decreased corrosive properties due to the addition of boron compounds.

DESCRIPTION OF THE RELATED ART

When deep drilling is carried out, generally use is made of suspensions of clay in salt water for discharging the cuttings. These drilling fluids further comprise polymers for forming protective colloids, as well as weighting materials, such as barite or chalk. These weighting materials, as solids, can adversely affect the Theological properties of the drilling fluids. Therefore, the prior art also includes soluble weighting materials. As such, use is made of alkali metal halides and alkaline earth metal halides, zinc bromide and alkali metal carboxylates, in particular formates, acetates and propionates of potassium and sodium. These salts exhibit a high solubility in water, and it is possible to prepare from them aqueous solutions of high density which nevertheless have a low viscosity.

J. D. Downs, SPE Paper No. 25177 discloses the use of alkali metal formates in drilling fluids. EP-A-0 572 113 discloses the use of potassium carboxylates and cesium carboxylates as drilling fluid aids.

Alkali metal carboxylates, however, have a serious disadvantage in certain cases in industrial use. When drilling passes through rock strata which comprise naturally occurring inorganic ion exchangers, such as zeolites, free carboxylic acids form from the carboxylates. The free carboxylic acids can lead to considerable corrosion on the drilling tools, in particular, since the drilling is carried out at high temperature.

The object of the present invention was thus to provide alkali-metal-carboxylate-containing drilling fluids which cause reduced corrosion on drilling tools.

Surprisingly, it has been found that the addition of boron compounds to alkali-metal-carboxylate-containing drilling fluids greatly decreases their corrosivity to metallic materials.

SUMMARY OF THE INVENTION

The invention relates to a water-based drilling fluid which comprises at least one alkali metal carboxylate and at least one soluble boron compound.

The invention further relates to the use of boron compounds in drilling fluids which comprise alkali metal carboxylates to decrease the corrosivity of these drilling fluids.

Alkali metal carboxylates are salts of lithium, sodium, potassium, rubidium or cesium with monobasic or dibasic carboxylic acids. Preferred carboxylic acids in this case are formic acid (alkali metal formates), acetic acid (alkali metal acetates) and propionic acid (alkali metal propionates). Preferred alkali metals are sodium, potassium and cesium.

DESCRIPTION OF THE PREFERRED EMBODIMENTS

Particular preference for the drilling fluids according to the invention is given to the alkali metal formates and here, particularly, potassium formate.

The corrosive properties of the alkali metal carboxylates are diminished by boron compounds. Preferably, the boron compounds are boric acids, borates, boron oxide or organic boron compounds.

Suitable boric acids are, in particular, orthoboric acid $B(OH)_3$, metaboric acid $HBO_2$ and complex boric acids which are obtainable by adding polyhydric alcohols (e.g. mannitol) to orthoboric acid.

As borates, preference is given to salts which comprise meta($BO_2^-$), ortho($BO_3^{3-}$), poly($B_nO_{2n-1}^{(n-2)-}$) or per ($BO_3^-$) borate ions. Among the polyborates, tetraborates are particularly preferred. As cations, preference is given to $Na^+$, $K^+$, $Mg^{2+}$, $Ca^{2+}$ and $NH_4^+$. Examples of preferred berates are sodium tetraborate, potassium tetraborate, calcium metaborate, potassium metaborate and sodium perborate.

Suitable organic boron compounds are those which do not have a tendency to spontaneous decomposition in an aqueous medium. Those which are suitable in particular are esters of boric acid with monohydric or dihydric alcohols, such as trimethyl borate, boric monoethanolamine ester or boric triethanolamine ester.

The amount of alkali metal carboxylates present in the drilling fluid is determined according to the type of the alkali metal carboxylate and according to the type and amount of the other constituents of the drilling fluid. Preference is given to an amount of alkali metal carboxylates which corresponds to 30 to 100% of the saturation level in the drilling fluid.

The drilling fluid according to the invention can also comprise other constituents, in addition to alkali metal carboxylates and boron compounds.

In a preferred embodiment, the drilling fluid according to the invention comprises clays to modify the viscosity. The clays can be added to the drilling fluids, or the clays can be bored solids. Among the clays, in particular, preference is given to those whose main constituents are magnesium silicate or aluminum silicate (bentonites). They are preferably used in amounts of from about 10 to 150 g/l of drilling fluid.

In a further preferred embodiment, the drilling fluid according to the invention comprises polymers of natural or synthetic origin which are capable of forming protective colloids. Such polymers are, for example, cellulose ethers, such as hydroxyethyl cellulose or salts of carboxymethyl cellulose or carboxymethyl hydroxyethylcellulose, starch and its derivatives and biopolymers (for example XC polymer, manufacturer: KELCO). Cellulose derivatives correspond, for example, to the formula

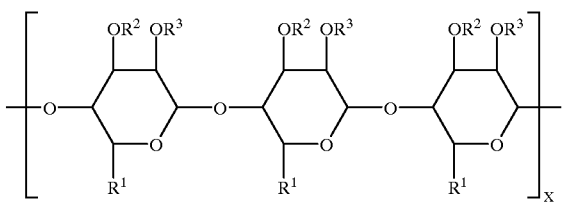

where $R^1$ is $-CH_2-(OC_2H_4)_n-OH$ where n=1 to 5 or $-CH_2-OCH_2COO^\square$ and $R^2$ and $R^3$ independently of one another are hydrogen or $-(C_2H_4O)_n-H$ where n=1 to 5. X is preferably of a value such that the mean molecular weight of these cellulose derivatives is between 10,000 and 1,000,000 units.

If, in the drilling fluid according to the invention, use is made of synthetic polymers, these are generally homopolymers or mixed polymers of ethylenically unsaturated compounds. Preference is given to those polymers which comprise structural units which can be derived from acrylic acid or its derivatives. In addition, preference is given to those polymers which comprise structural units which can be derived from vinyl-containing compounds.

Examples of monomers which can be used to prepare suitable polymers include: (meth)acrylic acid and its esters, (meth)acrylamides, acrylamidomethylpropanesulfonic acid, N-vinylpyrrolidone, acrylonitrile, N-monosubstituted and N-disubstituted (meth)acrylamides, acrylamidosulfonic acids, acrylamidobutyric acid, N-methyl-N-vinylacetamide, hydroxyalkylacrylates, vinylsulfonic acid, vinylcarboxamides.

If the drilling fluids according to the invention comprise polymers, the concentration of these polymers in the finished drilling fluid is preferably between 0.5 and 70 g/l, in particular from 3 to 30 g/l.

In a further preferred embodiment of the invention, the drilling fluid comprises a coinhibitor which intensifies the action of the boron compound used according to the invention. Preferred coinhibitors are alkali metal carbonates, alkali metal silicates, mono- and dicarboxylic acids, alkali metal benzoates, benzotriazoles, tolyltriazoles, alkali metal nitrites and alkali metal nitrates. Preferably, the coinhibitors are used in amounts of from 0.5 to 4% by weight, based on the weight of the finished drilling fluid, in particular in amounts of from 1 to 3% by weight.

EXAMPLES

Results are shown below which confirm the suitability of the drilling fluid according to the invention.

For all experiments, a drilling fluid was prepared comprising

| | |
|---|---|
| 350 ml | of potassium formate solution 50% |
| 3% by weight | of SWDC (salt water drilling clay) |
| 3% by weight | of Rev-Dust ® (simulated cuttings solids) |
| 3% by weight | of polymer of the type specified in the table. |

Corrosion protection:

1 = 1% by weight of borax + 2% by weight of $K_2CO_3$

TABLE 1

Viscosity of drilling fluids in mPas

| Corrosion protection | Test conditions | Polymer | | | | |
|---|---|---|---|---|---|---|
| | | Absent | CMC LV | CMHEC LV | VS-VA copolymer | Starch |
| none | 16 h/125° C. | 26 | 53 | 130 | 83 | 122 |
| 1 | 16 h/125° C. | 40 | 90 | 124 | 102 | 164 |
| none | 16 h/150° C. | 34 | 52 | 120 | 77 | 58 |
| 1 | 16 h/150° C. | 56 | 82 | 143 | 78 | 91 |
| none | 16 h/170° C. | 41 | 33 | 104 | 155 | 26 |
| 1 | 16 h/170° C. | 42 | 78 | 112 | 179 | 76 |
| none | 16 h/200° C. | | | | 95 | |
| 1 | 16 h/200° C. | | | | 121 | |

TABLE 2

API water loss in ml

| Corrosion protection | Test conditions | Polymer | | | | |
|---|---|---|---|---|---|---|
| | | Absent | CMC LV | CMHEC LV | VS-VA copolymer | Starch |
| none | 16 h/125° C. | >25 | 4.7 | 3 | 8.3 | 1.8 |
| 1 | 16 h/125° C. | >25 | 6.5 | 4.1 | 9 | 18 |
| none | 16 h/150° C. | 51 | 5.5 | 3.2 | 9 | 5.5 |
| 1 | 16 h/150° C. | 35 | 15.5 | 5.2 | 12 | 4.8 |
| none | 16 h/170° C. | 137 | 22 | 4.8 | 4.4 | 47.0 |
| 1 | 16 h/170° C. | 190 | 27 | 5.2 | 5.3 | 4.0 |
| none | 16 h/200° C. | | | | 4.5 | |
| 1 | 16 h/200° C. | | | | 12.5 | |

TABLE 3

Corrosion rate of the drilling fluid according to the invention on C-steel (DIN 1.1203) in mpy

| Corrosion protection | Test conditions | Polymer | | | | |
|---|---|---|---|---|---|---|
| | | Absent | CMC LV | CMHEC LV | VS-VA copolymer | Starch |
| none | 16 h/125° C. | 12.6 | 10.2 | 8.8 | 40.5 | 9.7 |
| 1 | 16 h/125° C. | 0.3 | 0 | 0 | 0 | 0.3 |
| none | 16 h/150° C. | 29.6 | 24.3 | 23 | 35.2 | 23.7 |
| 1 | 16 h/150° C. | 0 | 0.3 | 0 | 2.4 | 0.3 |

TABLE 3-continued

Corrosion rate of the drilling fluid according to the invention on C-steel (DIN 1.1203) in mpy

| Corrosion protection | Test conditions | Polymer | | | | |
|---|---|---|---|---|---|---|
| | | Absent | CMC LV | CMHEC LV | VS-VA copolymer | Starch |
| none | 16 h/170° C. | 21.6 | 35.6 | 32.0 | 59.6 | 46.0 |
| 1 | 16 h/170° C. | 0.3 | 0.3 | 0 | 10.4 | 0.3 |
| none | 16 h/200° C. | | | | 135 | |
| 1 | 16 h/200° C. | | | | 38 | |

TABLE 4

Comparison of the properties for various concentrations of potassium formate

| | Test conditions | Polymer | | | | |
|---|---|---|---|---|---|---|
| | | Absent | CMS LV | CMHEC LV | VS-VA copolymer | Starch |
| Corrosion [mpy] | Potassium formate solution 70% strength | | 0 | 0.3 | none | 0 |
| Viscosity [mPas] | Potassium formate solution 70% strength | | 94 | 66 | soluble | 290 |
| API water loss [ml] | Potassium formate solution 70% strength | | 10 | 42 | | 2.8 |
| Corrosion [mpy] | Potassium formate solution 50% strength | 0 | 0.3 | 0 | 2.4 | 0.3 |
| Viscosity [mPas] | Potassium formate solution 50% strength | 56 | 82 | 143 | 78 | 91 |
| API water loss [ml] | Potassium formate solution 50% strength | 35 | 15.5 | 5.2 | 12 | 4.8 |
| Corrosion [mpy] | Potassium formate solution 30% strength | | 0 | 0.3 | 0 | 0.3 |
| Viscosity [mPas] | Potassium formate solution 30% strength | | 74 | 125 | 66 | 58 |
| API water loss [ml] | Potassium formate solution 30% strength | | 15.5 | 5.3 | 9.5 | 36 |

What is claimed is:

1. A water-based drilling fluid which comprises at least one alkali metal carboxylate, at least one soluble boron compound, and clay.

2. The drilling fluid as claimed in claim 1, wherein the alkali metal carboxylate is a cesium, sodium and/or potassium salt of formic acid, acetic acid and/or propionic acid.

3. The drilling fluid as claimed in claim 1, wherein the boron compound is boric acid, borates, boron oxide or an organoboron compound.

4. The drilling fluid as claimed in claim 1, wherein it comprises, in amounts of from 0.5 to 70 g/l of drilling fluid, polymers capable of forming protective colloids.

5. The drilling fluid as claimed in claim 4, wherein the polymers are cellulose ethers, starch, starch derivatives, biopolymers or homopolymers or mixed polymers of ethylenically unsaturated compounds.

6. A drilling fluid comprising at least one alkali metal carboxylate, at least one soluble boron compound and from 0.5 to 4% by weight, based on the weight of the finished drilling fluid, of coinhibitors, selected from the group consisting of alkali metal carbonates, alkali metal silicates, mono- and dicarboxylic acids, alkali metal benzoates, benzotriazoles, tolytriazoles, alkali metal nitrites and alkali metal nitrates.

* * * * *